US010570891B2

(12) United States Patent
Alefelder et al.

(10) Patent No.: US 10,570,891 B2
(45) Date of Patent: Feb. 25, 2020

(54) BUSBAR SYSTEM (71) Applicant: Siemens Aktiengesellschaft, Munich (DE)

(72) Inventors: Frank Alefelder, Neunkirchen-Seelscheid (DE); Frank Bertels, Cologne (DE); Rainer Haar, Bonn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/512,993

(22) PCT Filed: Sep. 7, 2015

(86) PCT No.: PCT/EP2015/070372
§ 371 (c)(1),
(2) Date: Mar. 21, 2017

(87) PCT Pub. No.: WO2016/045950
PCT Pub. Date: Mar. 31, 2016

(65) Prior Publication Data
US 2017/0298909 A1 Oct. 19, 2017

(30) Foreign Application Priority Data
Sep. 22, 2014 (DE) .......................... 10 2014 218 994
Sep. 22, 2014 (DE) .................... 20 2014 007 785 U (51) Int. Cl.
F03D 80/80 (2016.01)
H02G 5/06 (2006.01)
(Continued)

(52) U.S. Cl.
CPC ............... *F03D 80/85* (2016.05); *H02G 5/06* (2013.01); *H02G 5/005* (2013.01); *H02G 5/007* (2013.01); *H02G 5/025* (2013.01); *Y02E 10/72* (2013.01)

(58) Field of Classification Search
CPC .......... H02G 5/007; H02G 5/005; H02G 5/06; H02G 5/025; H02G 5/10; H02G 5/08;
(Continued)

(56) References Cited

U.S. PATENT DOCUMENTS 3,376,377 A * 4/1968 Fehr, Jr. ................. H02G 5/007
174/72 B
3,459,874 A * 8/1969 Fouse .................... H02G 5/007
174/68.2
(Continued)

FOREIGN PATENT DOCUMENTS

CN 103633591 A 3/2014
CN 203774572 U 8/2014
(Continued)

OTHER PUBLICATIONS

English Translation of WO 2013120703.*
(Continued)

Primary Examiner — Edwin A. Leon
Assistant Examiner — Matthew T Dzierzynski
(74) Attorney, Agent, or Firm — Harness, Dickey & Pierce, P.L.C.

(57) ABSTRACT

A busbar system includes a plurality of bar modules arranged one behind the other and connected to each other via clamping brackets. Each bar module has a plurality of busbars. The bar module end including the recesses running in a longitudinal extension is inserted into the clamping bracket and the bar module end with the recesses running transversely to the longitudinal extension is suspended on
(Continued)

the opposite side in the clamping bracket. Each of the busbars of the one bar module rests laterally against a busbar of the other bar module and the recesses, as viewed from the side, form a through-opening, through which a tensioning element supported on the clamping bracket runs, which presses together the sides of the busbars which rest against each other.

16 Claims, 13 Drawing Sheets

(51) Int. Cl.
*H02G 5/00* (2006.01)
*H02G 5/02* (2006.01)

(58) Field of Classification Search
CPC .. H02G 3/0493; H02G 3/0418; H02G 3/0462; H02G 5/002; H02G 5/04; H02G 5/066; H01R 25/145; H01R 25/162; H01R 4/30
USPC .............. 439/213, 210, 212, 114, 115
See application file for complete search history.

(56) References Cited

U.S. PATENT DOCUMENTS

| | | | | |
|---|---|---|---|---|
| 3,786,394 A | * | 1/1974 | Koenig | H02G 5/007 174/88 B |
| 4,213,003 A | * | 7/1980 | Carlson | H02G 5/007 174/68.2 |
| 4,627,680 A | * | 12/1986 | Weimer | H02G 5/007 174/88 B |
| 4,842,533 A | * | 6/1989 | Beberman | H02G 5/007 174/88 B |
| 5,783,779 A | * | 7/1998 | Graham | H02G 5/007 174/88 B |
| 5,785,542 A | | 7/1998 | Johnson | |
| 7,819,681 B1 | * | 10/2010 | Rodrigues | H02G 5/007 174/88 B |
| 8,378,219 B2 | * | 2/2013 | Lesieur | H02G 5/007 174/129 B |
| 8,860,238 B2 | * | 10/2014 | Wiechers | H02B 3/00 290/44 |
| 8,900,002 B2 | * | 12/2014 | Mooney | H01R 4/60 439/212 |
| 9,197,045 B2 | * | 11/2015 | Jur | H02G 3/0418 |
| 9,647,435 B2 | * | 5/2017 | Alefelder | H02G 5/025 |
| 2013/0170929 A1 | | 7/2013 | Wiechers | |

FOREIGN PATENT DOCUMENTS

| | | | |
|---|---|---|---|
| DE | 19910010388 U | 3/1993 | |
| DE | 102009032619 A1 | 1/2011 | |
| EP | 0530521 B1 | 11/1995 | |
| WO | WO-2012038177 A1 | 3/2012 | |
| WO | WO-2013120703 A1 * | 8/2013 | ............ H02G 5/025 |
| WO | WO-2013152885 A1 | 10/2013 | |

OTHER PUBLICATIONS

Chinese Office Action dated Mar. 30, 2018.
Internatonal Search Report dated Nov. 5, 2015, issued in corresponding International Application No. PCT/EP2015/070372.
Office Action dated Jul. 13, 2015, issued in corresponding German Application No. 102014218994.2.

* cited by examiner

BUSBAR SYSTEM

PRIORITY STATEMENT

This application is the national phase under 35 U.S.C. § 371 of PCT International Application No. PCT/EP2015/070372 which has an International filing date of Sep. 7, 2015, which designated the United States of America and which claims priority to German patent application numbers DE 102014218994.2 filed Sep. 22, 2014 and DE 202014007785.1 filed Sep. 22, 2014, the entire contents of each of which are hereby incorporated herein by reference.

FIELD

An embodiment of invention generally relates to a busbar system, which has bar modules comprising a plurality of busbars which are arranged parallel to one another at a distance.

BACKGROUND

The busbars of known busbar systems generally transmit electrical energy from an energy source to a load. Insulating bodies which are arranged between the busbars serve to space apart the busbars. Since the length of the busbars is limited, connectors (brackets) are provided for connecting the busbars, wherein in each case two busbars which are situated one behind the other are connected to one another.

As an alternative to the busbars, electrical cables which transmit the electrical energy by means of the cores of the cable are known, wherein the cores correspond to the busbars.

When used in wind power plants in which the cables conduct the electrical energy from the generator at the top in the wind tower (tower) of the plant downward to a transformer, the mounting and laying of the cables in the tower is very complicated. Laying cables in the tower is made very difficult particularly at low temperatures at which the cables are quite stiff.

SUMMARY

A busbar system, of an embodiment, is for passing on electrical energy, which busbar system is relatively simple to mount, in particular vertically, for example in the wind tower of a wind power plant.

At least one embodiment of the invention is directed to a busbar system in which a plurality of bar modules are arranged one behind the other in the longitudinal direction and are connected to one another by means of clamping brackets, wherein each bar module has a plurality of busbars which are arranged parallel to one another at a distance and which each have a recess, which is open on one side, at both ends, the recess running in the longitudinal direction of the busbars at one end and running transversely to the longitudinal direction of the busbars at the other end, wherein, for the purpose of electrically connecting two bar modules, the bar module end is plugged into the clamping bracket by way of the recesses which run in the longitudinal direction, and the bar module end with the recesses which run transversely to the longitudinal direction is suspended in this (the same) clamping bracket on the opposite side, wherein in each case one busbar of one bar module bears laterally against a busbar of the other bar module, and wherein the recesses, as seen from the side, form a passage opening through which a clamping element which is supported against the clamping bracket runs, the clamping element pressing the two sides of the busbars, which sides each bear against one another, against one another.

BRIEF DESCRIPTION OF THE DRAWINGS

The invention will be described in greater detail below with reference to an example embodiment. In the drawing.

DETAILED DESCRIPTION OF THE EXAMPLE EMBODIMENTS

At least one embodiment of the invention is directed to a busbar system in which a plurality of bar modules are arranged one behind the other in the longitudinal direction and are connected to one another by means of clamping brackets, wherein each bar module has a plurality of busbars which are arranged parallel to one another at a distance and which each have a recess, which is open on one side, at both ends, the recess running in the longitudinal direction of the busbars at one end and running transversely to the longitudinal direction of the busbars at the other end, wherein, for the purpose of electrically connecting two bar modules, the bar module end is plugged into the clamping bracket by way of the recesses which run in the longitudinal direction, and the bar module end with the recesses which run transversely to the longitudinal direction is suspended in this (the same) clamping bracket on the opposite side, wherein in each case one busbar of one bar module bears laterally against a busbar of the other bar module, and wherein the recesses, as seen from the side, form a passage opening through which a clamping element which is supported against the clamping bracket runs, the clamping element pressing the two sides of the busbars, which sides each bear against one another, against one another.

The clamping brackets are advantageously (fixedly) arranged on a supporting mechanism, and the supporting mechanism is, in particular, a tower of a wind power plant, wherein the bar modules are arranged vertically one behind the other in the interior of the tower, and the clamping bracket is in each case fastened to the supporting mechanism by means of an elastic bearing.

In this case, the clamping bracket is preferably in each case formed as a separate unit.

For simple mounting, the clamping bracket in each case further has electrically insulating separating elements which are spaced apart from one another in parallel, wherein the distance between the separating elements and the shape of the separating elements are such that the busbars can be plugged in on one side and can be suspended on the other side.

In order to compensate for mechanical vibrations, it is proposed that the clamping brackets are fastened to the supporting mechanism by means of an elastic bearing.

Simple electrical insulation of the busbars from one another is provided by spacer elements which are plugged one into the other, the spacer elements in each case having a cylindrical central part against which a busbar bears in each case, wherein a conical projection which extends radially outward between two directly adjacent busbars is arranged on the casing of the central part.

For the purpose of adjusting to different current-related requirements more easily, it is proposed that the busbars which are arranged next to one another have (in particular different widths given the same thickness and length and therefore) different cross sections.

For a plurality of electrical circuits which are to be connected for current flow, a corresponding number of electrical circuit packages are preferably arranged next to one another transversely to the longitudinal extent, it being possible for, in particular, a busbar to be arranged between the electrical circuit packages as a common ground conductor.

It is technically simple for a frame with a passage opening to be arranged in the housing, the busbars running through the passage opening so as to leave a distance, which frame has a supporting element which is arranged on the outer contour of the frame and can be moved in the direction of longitudinal extent in the housing when it makes contact with the directly facing inner side of the housing.

Simple cooling is achieved in the case of vertical orientation when the frame has through-openings which, in cooperation with the housing, allow a chimney effect for cooling the busbars.

Mounting can be further simplified when the recesses which run transversely to the longitudinal direction have a widened portion, which runs in the longitudinal direction, at least in the case of one bar module.

Figure 1:
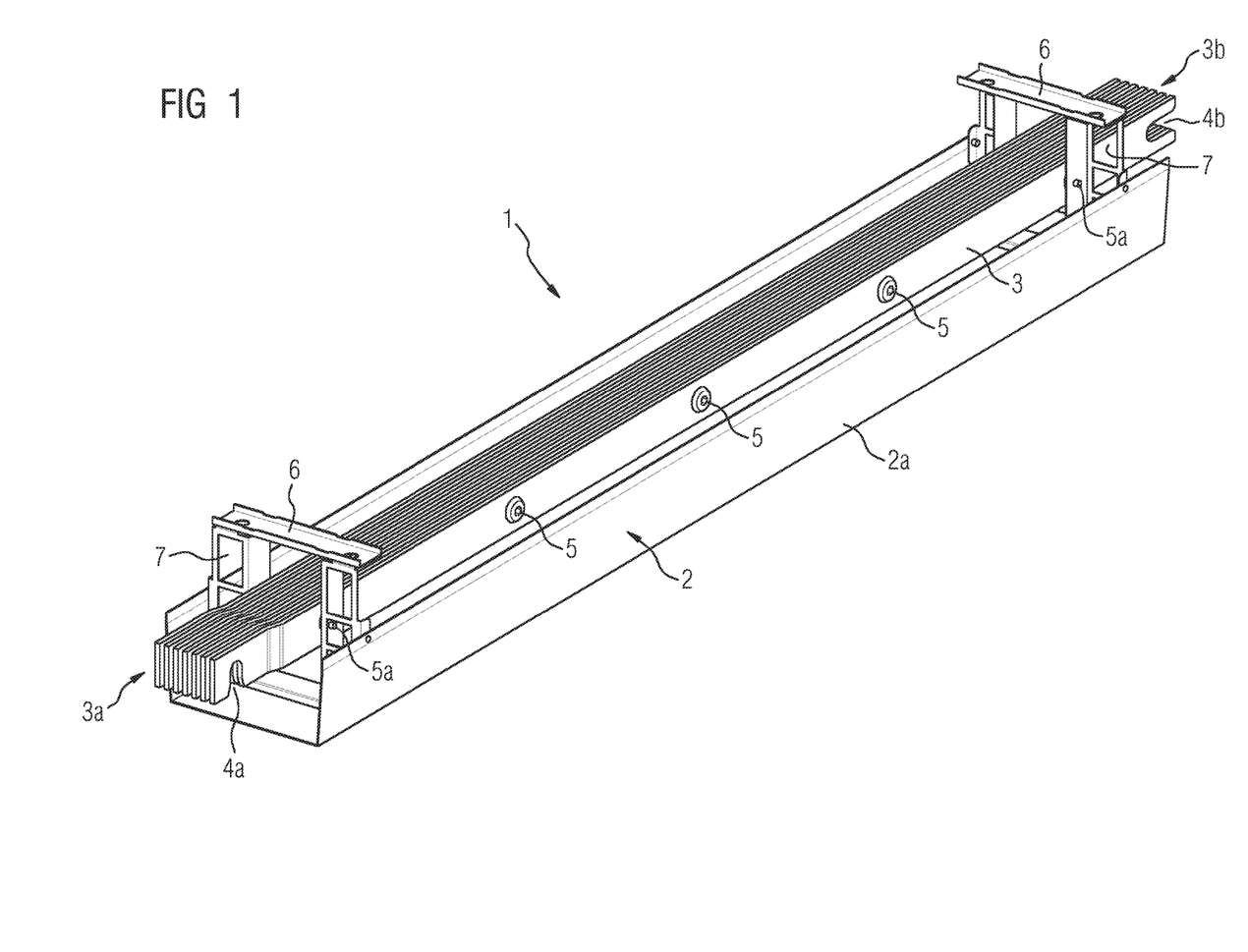
FIG. 1 is a three-dimensional illustration of a bar module with the upper part of the two-part housing removed.

FIG. 1 shows a bar module 1 comprising a two-part housing 2, of which only the lower part 2a is shown. The upper part 2b (see FIGS. 2 and 14) of the housing 2 is removed in FIG. 1. The housing 2 contains a plurality of busbars 3 which are arranged parallel to one another at a distance A and which have recesses 4a, 4b, which are open on one side, at both ends 3a, 3b. The recesses 4a all run transversely to the longitudinal extent of the busbars 3 (side hooks) at one end 3a; the recesses 4b all each run in the longitudinal direction (front hooks) at the opposite end 3b. The busbars 3 are held together by clamping elements in the form of screws 5, 5a, wherein the screws 5a are additionally fastened to a frame 6 in the region of the ends 3a, 3b.

The frames 6 ensure that the busbars 3 in the housing 2 are arranged at a distance from the inner sides of the walls of the housing 2 and are supported when they make contact with the inner sides. There are through-openings 7 in the frames 6.

Figure 2:
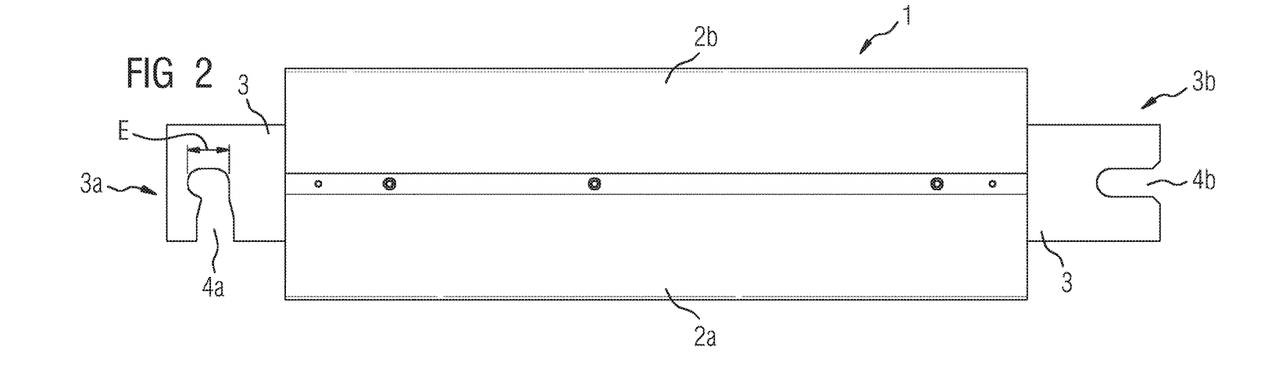
FIG. 2 shows a bar module according to FIG. 1 with busbars which have a widened portion, which runs in the longitudinal direction, of the recesses which run transversely to the longitudinal direction.

FIG. 2 shows an alternative bar module 1 in which the recesses 4a which run transversely to the longitudinal direction of the busbars 3 have a widened portion E which runs in the longitudinal direction and which serves substantially as length compensation during mounting. The widened portion E lies in each case on a line with the longitudinal extent of the recess 4b here.

Figure 3:
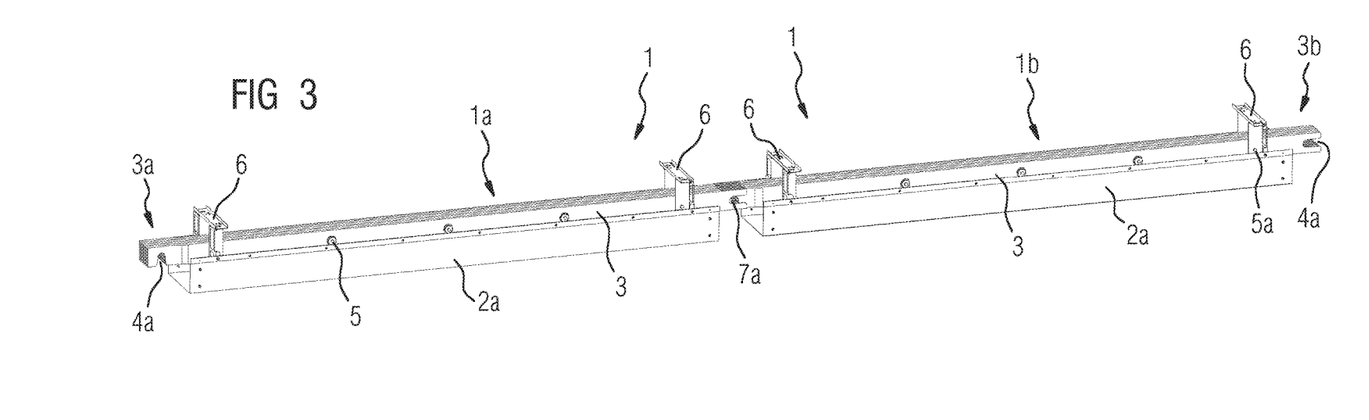
FIG. 3 shows two bar modules according to FIG. 1 which are situated one behind the other.

FIG. 3 is a three-dimensional illustration of two bar modules 1a, 1b, which are situated one behind the other, of a busbar system, wherein the alternating recesses 4a and 4b of the two bar modules 1a, 1b, as seen from the side, form a closed passage opening 7a, that is to say respectively the front hooks (recesses 4b) of one (here the left-hand-side) bar module 1a and the side hooks (recesses 4a) of the other (here the right-hand-side) bar module 1b.

Figure 4:
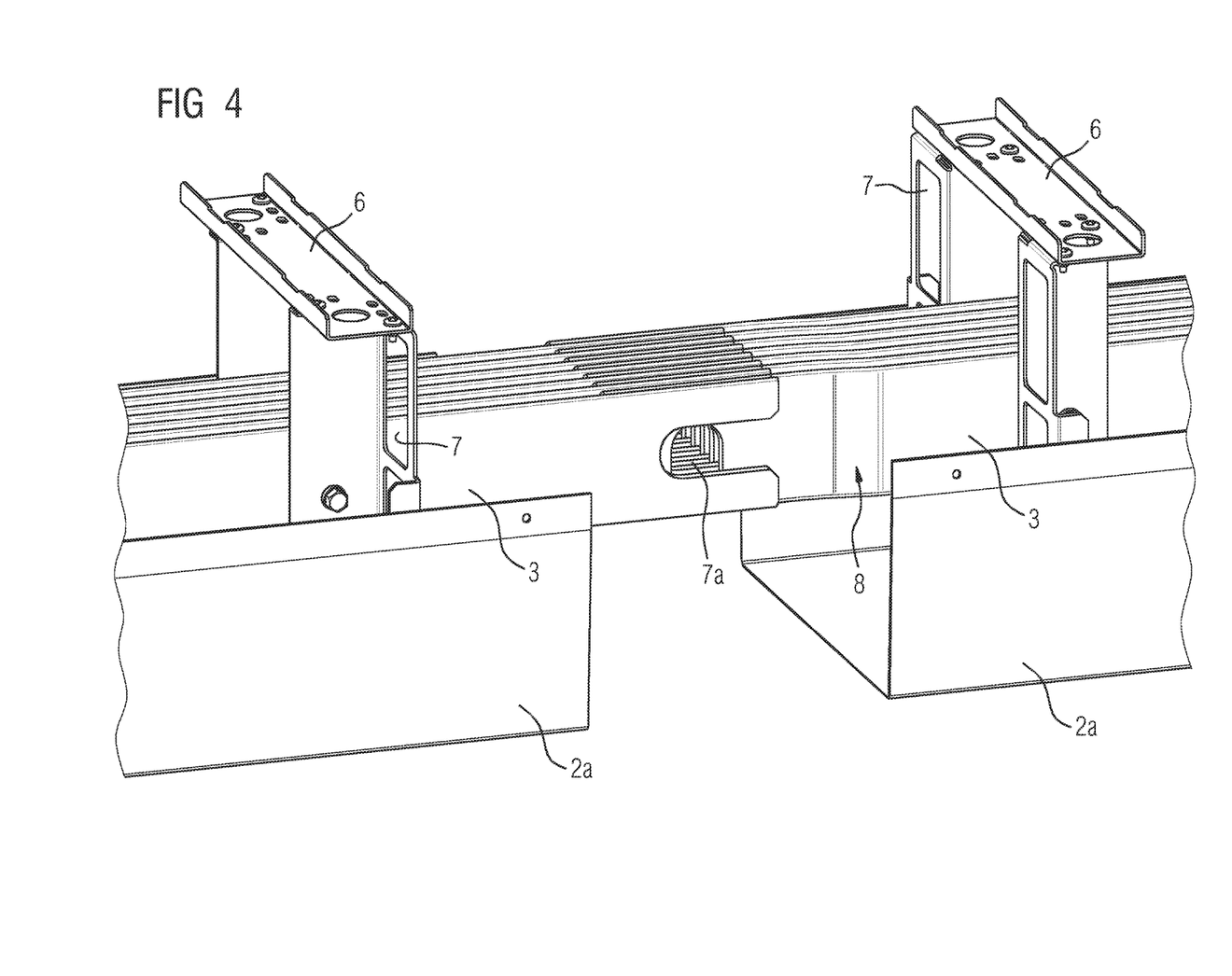
FIG. 4 is an enlarged illustration of the central region between the two bar modules according to FIG. 3.

The passage opening 7a is clearly shown in FIG. 4 which is an enlarged illustration of the central region of FIG. 3.

Figure 5:
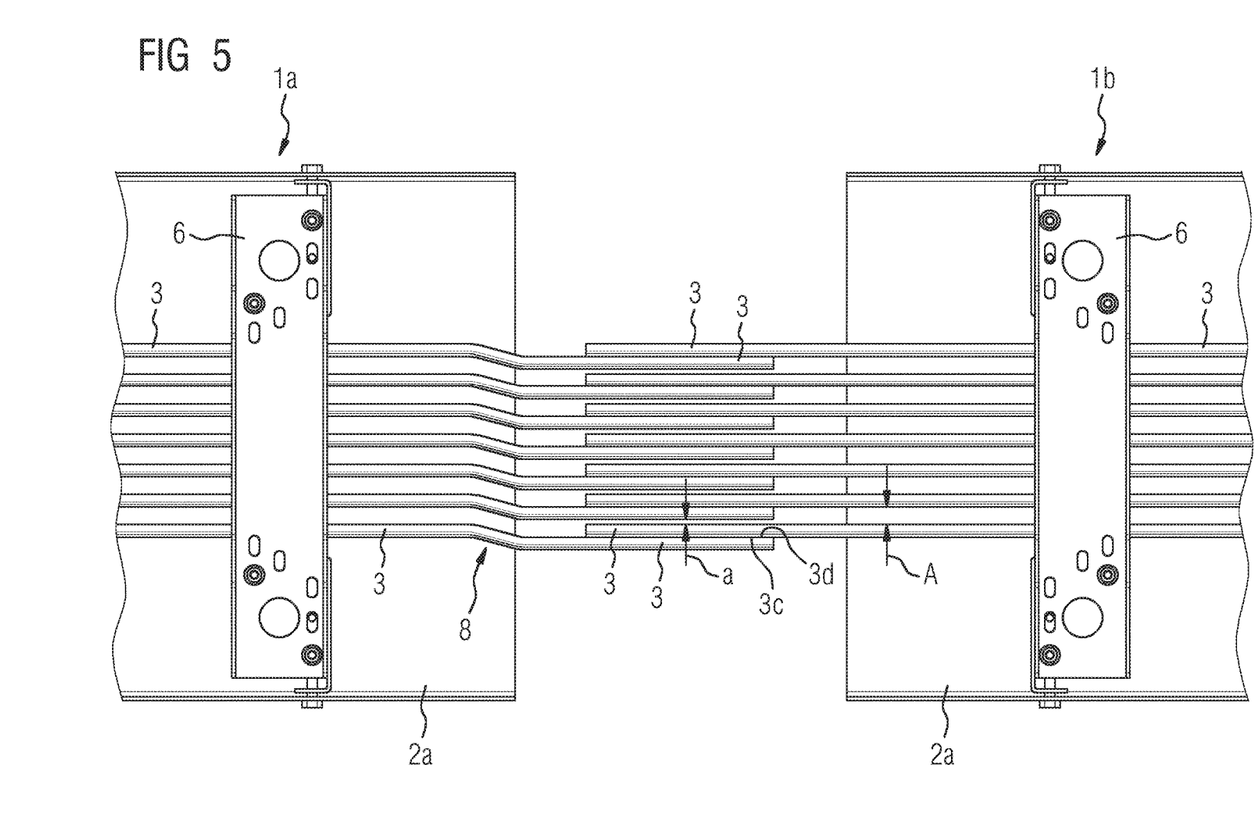
FIG. 5 shows the central region between the two bar modules according to FIG. 4 as seen from above.

FIG. 5 shows the central region of FIG. 4 from above, wherein it can be seen that in each case one busbar 3 of the bar module 1a (side 3c) bears laterally against in each case one busbar 3 of the bar module 1b (side 3d). In this way, one busbar 3 of one bar module 1a is respectively electrically connected to a busbar 3 of the other bar module 1b. There is a distance a between the busbars 3 which bear against one another (the busbar pairs), the distance being established by spacer elements 18 (see FIG. 10), omitted from FIG. 5, which are arranged between the busbars 3. In order to avoid an offset within the housing 2, all of the busbars 3 at one end (here the end 4a) are correspondingly bent, that is to say they each have a bent portion 8.

Figure 6:
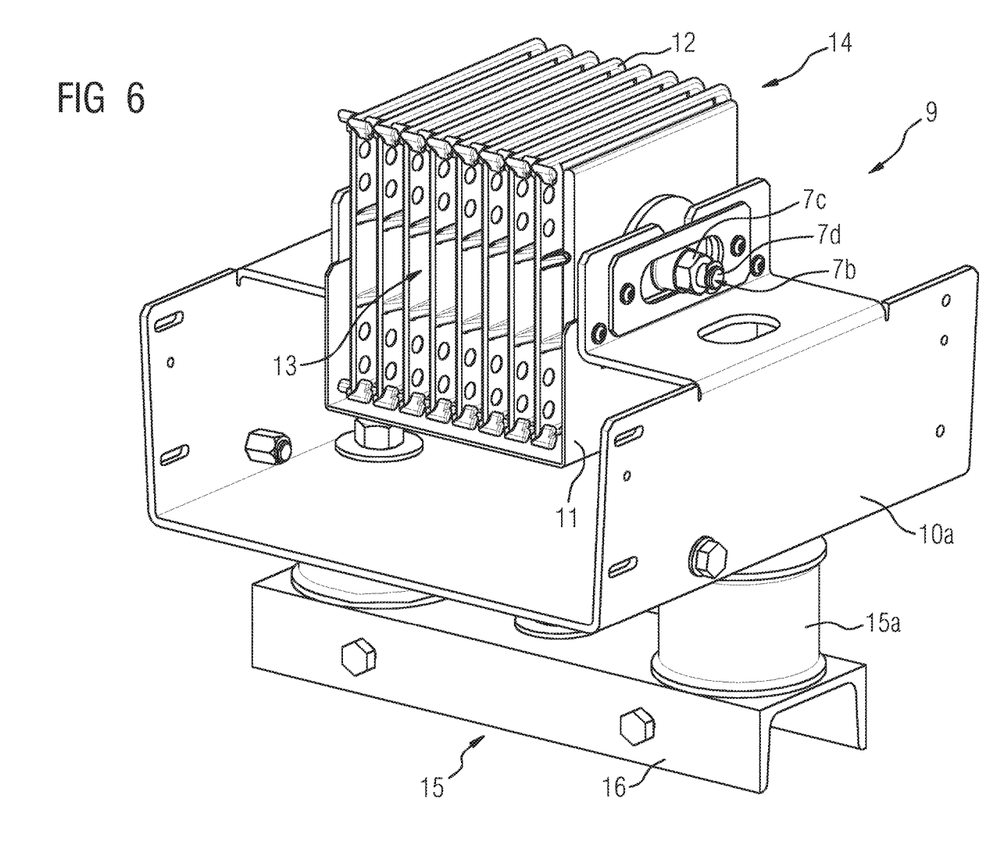
FIG. 6 shows a clamping bracket, which forms a unit, for connecting two bar modules according to FIGS. 1 and 2.

FIG. 6 shows a connector in the form of a clamping bracket 9 which is, in particular, in the form of a separate unit here and serves to connect the busbars 3 and therefore two bar modules 1a, 1b. The clamping bracket 9 likewise has a lower housing part 10a which can be connected to the lower housing part 2a of the two bar modules 1a, 1b (see FIG. 14). A u-shaped rotation-prevention means 11 serves to prevent rotation of the separating elements 12, the rotation-prevention means containing the electrically insulating separating elements 12 which are at a distance from one another in parallel in the form of insulating plates, wherein the distance between the separating elements and the shape of the separating elements, in particular at the edge, are such that the busbars 3 can be easily plugged into the front side 13, shown in FIG. 6, (can be plugged onto a bolt), and can be easily suspended (can be suspended on the bolt in the manner of a hook) from above on the other side 14. In this case, the separating elements 12 bear laterally against the (overlapping) busbars 3, which bear against one another in pairs, in the overlap region. The lower housing part 10a can further be mounted on the supporting mechanism by means of dampers 15a (in particular which are composed of rubber), which are cylindrical here, and a fastening profile 16 which together form an elastic bearing 15.

Therefore, the busbars 3 are arranged in the clamping bracket 9 in the manner shown in FIGS. 4 and 5, wherein the distance a is filled by the separating elements 12 which are omitted from FIGS. 4 and 5. The cylindrical bolt forms a clamping element 7b, here simply a screw 7d which is covered with an insulating tube (also see FIGS. 7 and 8) and which has a thread and a nut 7c and which extends through the passage opening 7a. The sides 3c, 3d, which each bear against one another, of the busbars 3 which overlap in respect of length are firmly pressed against one another by means of the screw 7d and thereby fastened in the clamping bracket 9 and connected to one another. The screw 7d (the bolt, the clamping element 7b) forms a clamping block together with the separating elements 12.

Figure 7:
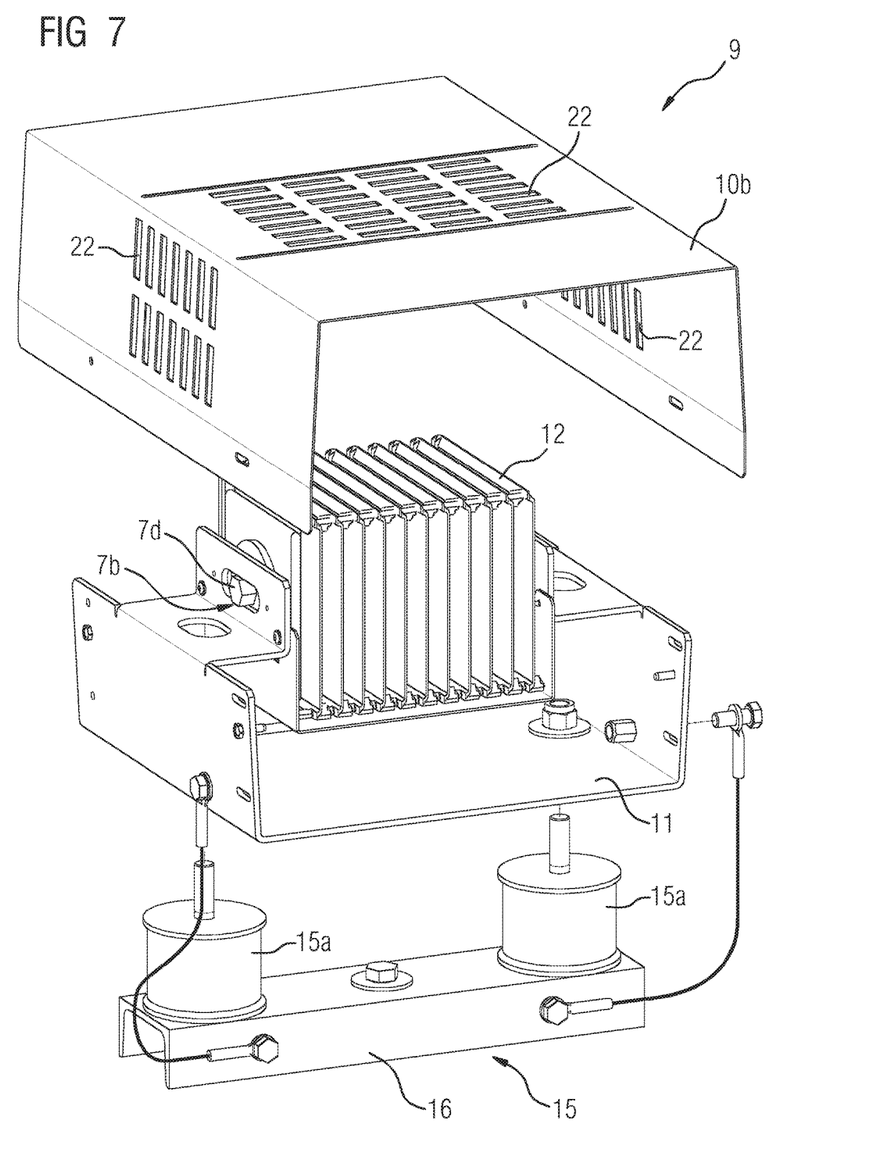
FIG. 7 is an exploded illustration of the clamping bracket according to FIG. 6.

FIG. 7 is an exploded illustration of the clamping bracket 9, which can be mounted on the supporting mechanism as a unit before the bar modules 1a, 1b are mounted, including the upper housing part 10b.

Figure 8:
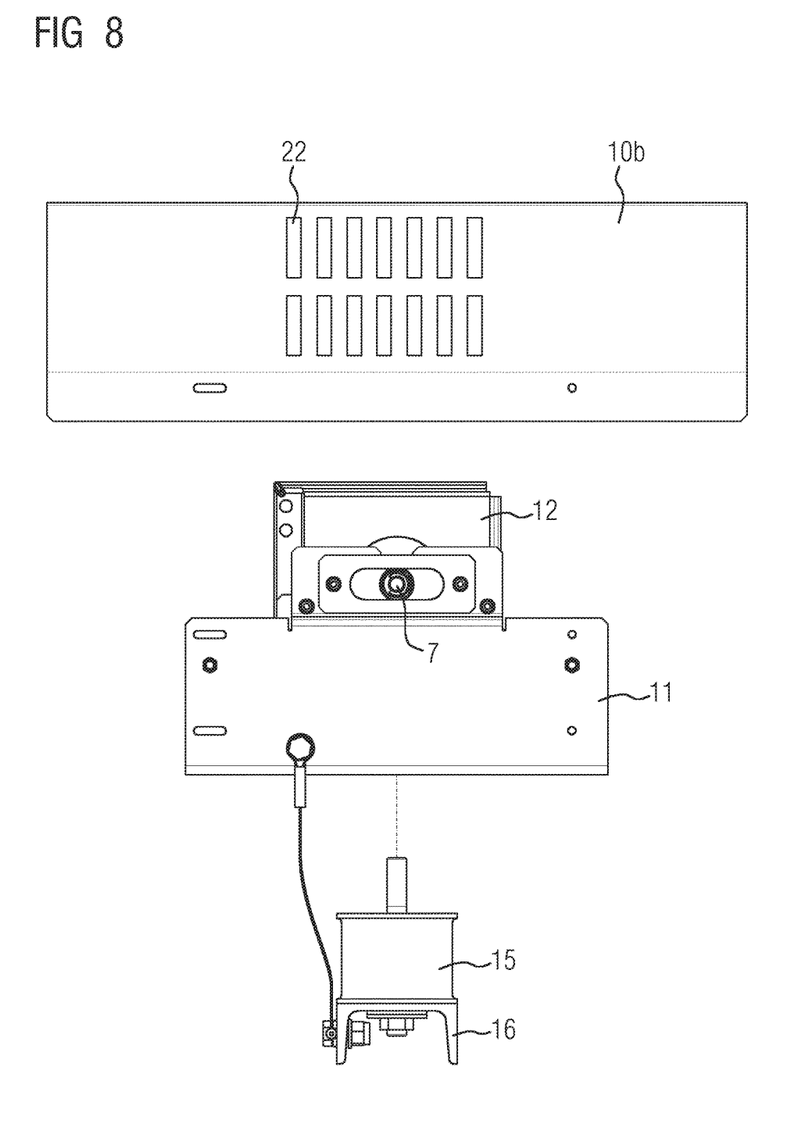
FIG. 8 shows a side view of the clamping bracket according to FIG. 7.

FIG. 8 shows the clamping bracket 9 according to FIG. 7 from the side.

Figure 9:
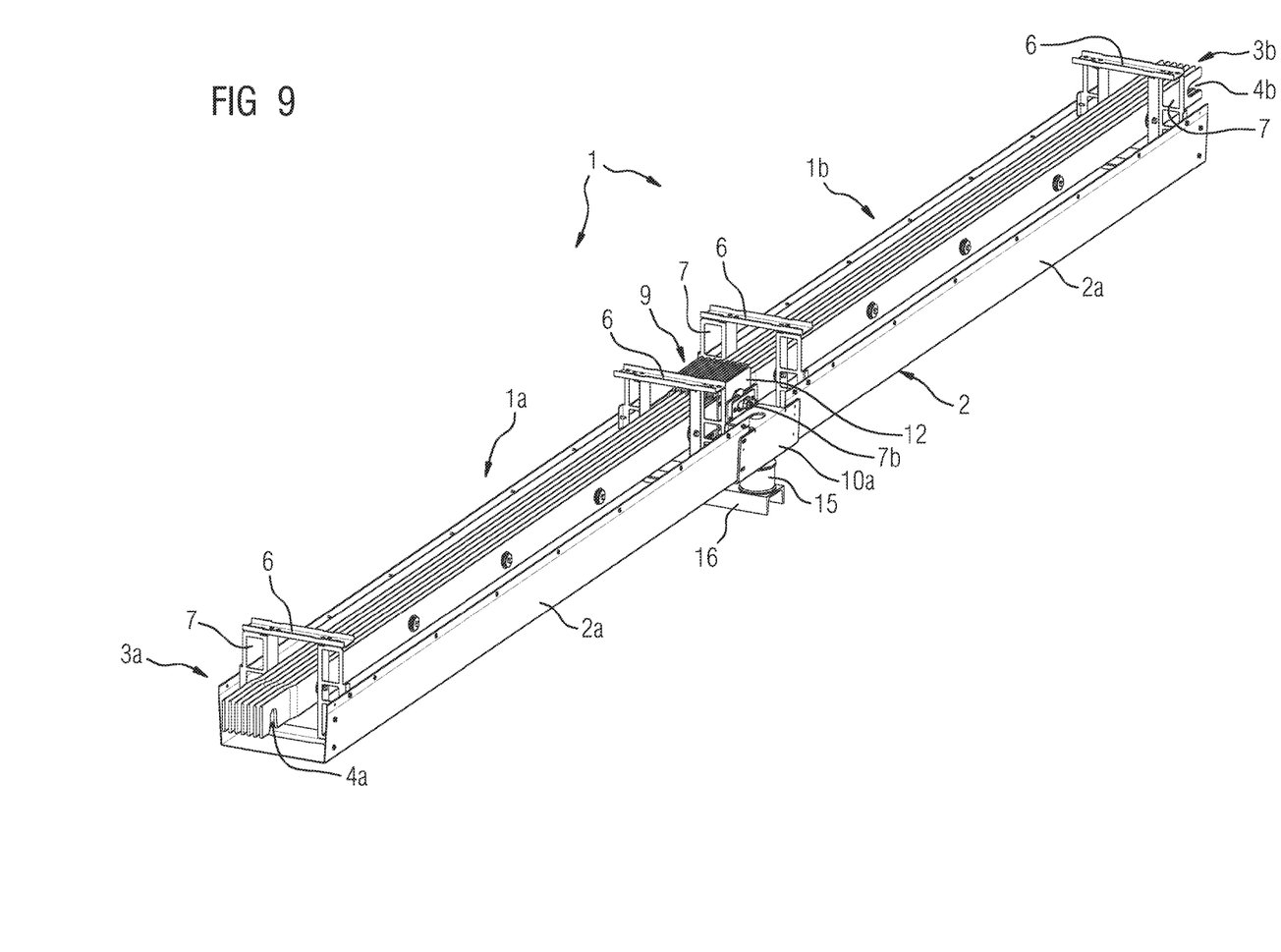
FIG. 9 shows two bar modules according to FIG. 1 which are connected to one another by means of a clamping bracket, with the housing open.

FIG. 9 shows the two bar modules 1a, 1b and the clamping bracket 9, wherein the busbars 3—as shown in FIGS. 3, 4 and 5—are situated in the clamping bracket 9 in a manner insulated from one another by the separating elements 12.

Figure 10:
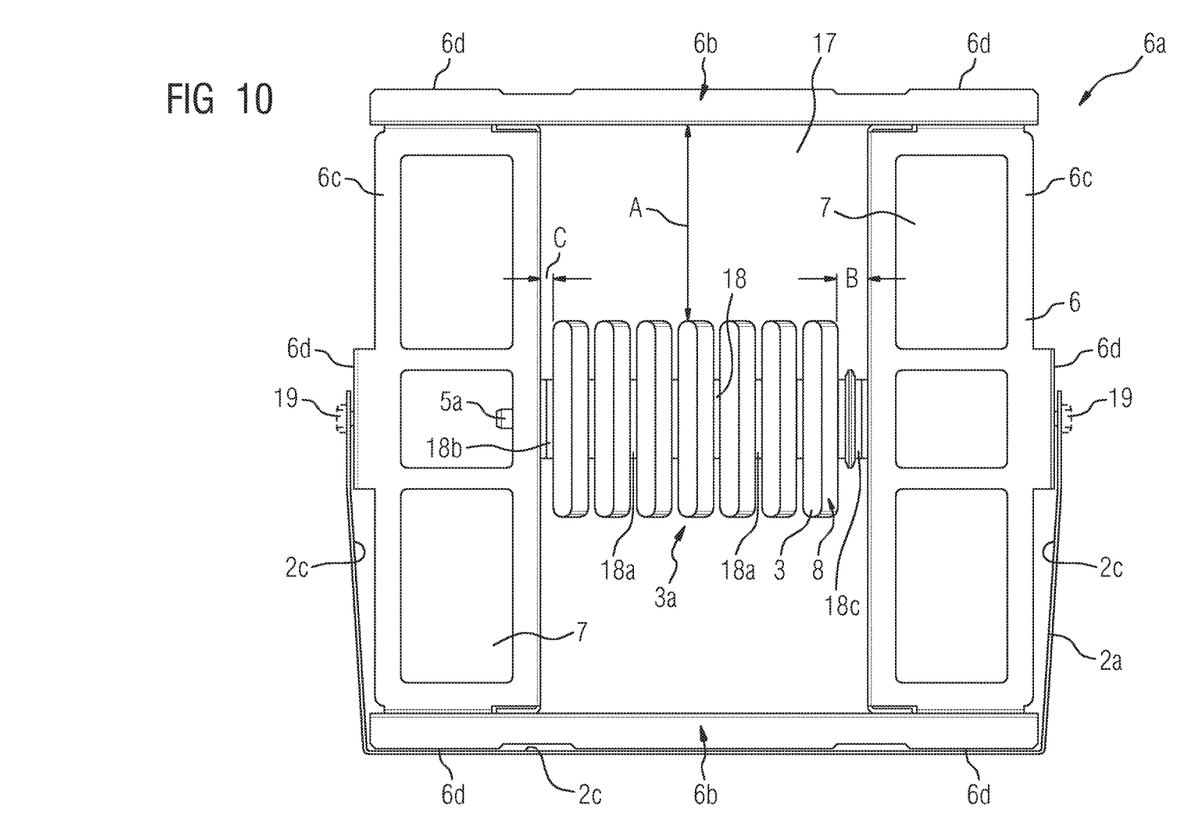
FIG. 10 shows the end of the bar module according to FIG. 1 and, respectively, FIG. 9 as seen in the direction of longitudinal extent.

FIG. 10 shows the end 3a of the bar module 1a according to FIG. 1 and, respectively, FIG. 9 as seen in the direction of longitudinal extent of the busbars 3, wherein the frame 6 is clearly shown. Each frame 6 comprises four struts 6b, 6c which form a passage opening 17. The busbars 3 run through the passage opening 17 so as to leave a distance A, B, C. Spacer elements 18 between the busbars 3 and the frame 6 ensure that the busbars 3 are electrically insulated from one another. The ends of the screws 5a (clamping element 5b) are fastened to the frame 6 on both sides of the passage opening 9.

The housing 2a can be temporarily fastened—for example for transportation purposes—to two outer sides of the frame 6, which are averted from one another, by means of screws 19. The screws 19 are absent during operation since this may otherwise lead to large expansion-related stresses depending on the temperature between the housing 2 and the frame 6 (the busbars 3). The outer contour of the frame 6 is formed by the edges 6d in FIG. 10.

Figure 11:
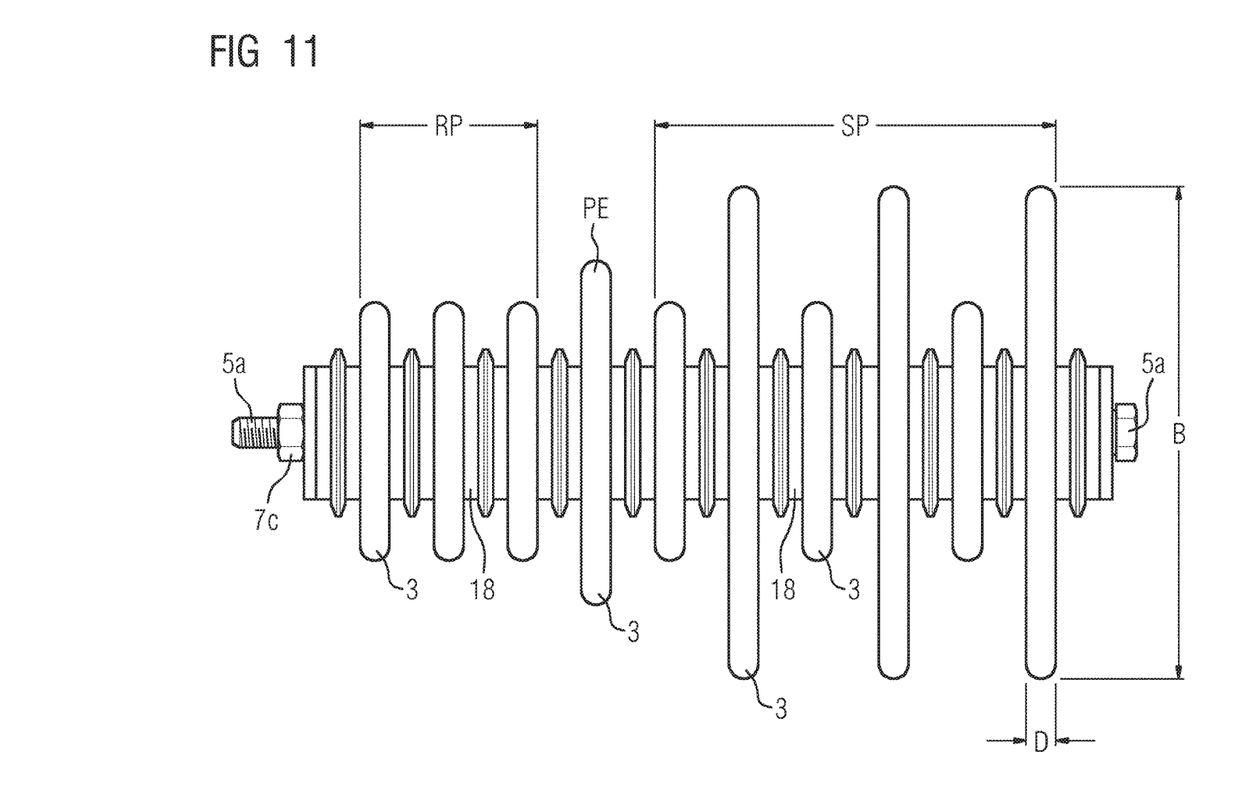
FIG. 11 shows the busbars according to FIG. 10 which are arranged next to one another and have different cross sections.

FIG. 11 shows an alternative design of the busbars 3 which are arranged next to one another and which here have different widths B given the same thickness D and length, and therefore different cross sections. This allows, in particular, the entire busbar package comprising busbars 3 to be used for more than one electrical circuit. Therefore, the overall cross section of the busbars 3 which are connected to the stator in the case of a wind power plant in particular (package SP) can be selected to be larger than the overall cross section of the busbars 3 which are connected to the rotor (package RP). Here, a common busbar 3 is especially (that is to say not necessarily) arranged as a common ground conductor PE (protection earth), which has a mean width B here, between the packages SP, RP, that is to say generally between two (parallel) systems which are arranged next to one another. In this case, the frame 6 can be of, in particular, two-part design (not shown).

Figure 12:
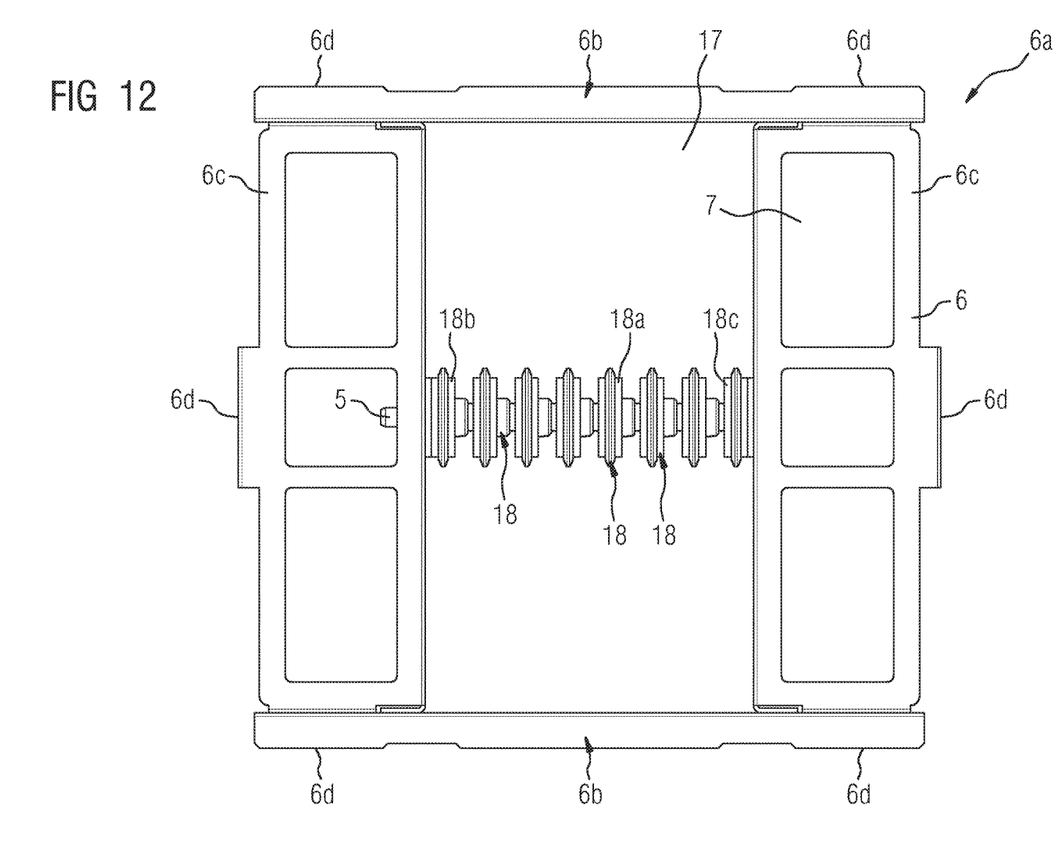
FIG. 12 shows the view according to FIG. 10 without the busbars.

FIG. 12 shows the view according to FIG. 10 without the busbars 3. The figure shows the spacer elements 18 which are arranged next to one another and are in each case plugged one into the other here.

Figure 13:
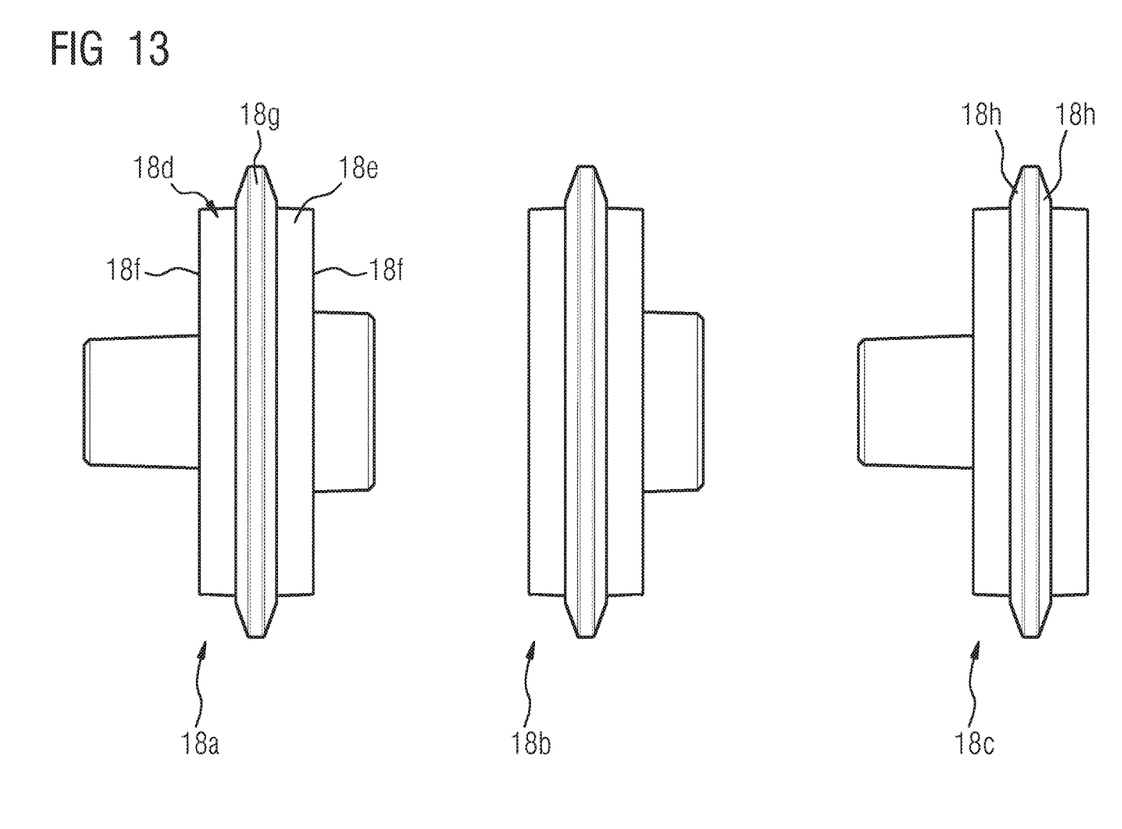
FIG. 13 shows three designs of the spacer elements which can be plugged one into the other.

FIG. 13 shows the spacer elements 18, which can be plugged one into the other and which have three designs 18a, 18b, 18c, individually, wherein the designs 18b and 18c are each arranged such that they are situated on the outside. The spacer elements 18 each have a cylindrical central part 18d which, in the mounted state (see FIG. 12), runs coaxially to the screw 5 and forms an insulating disk with a passage hole. Up to the outer central parts 18d, a busbar 3 bears against the end sides 18f of the central parts in each case. A radial conical projection 18g is arranged centrally on the casing 18e, the two bevels 18h of the projection collecting and possibly diverting away, for example, droplets of condensation water and the like. The designs 18b and 18c can also be dispensed with in principle.

Figure 14:
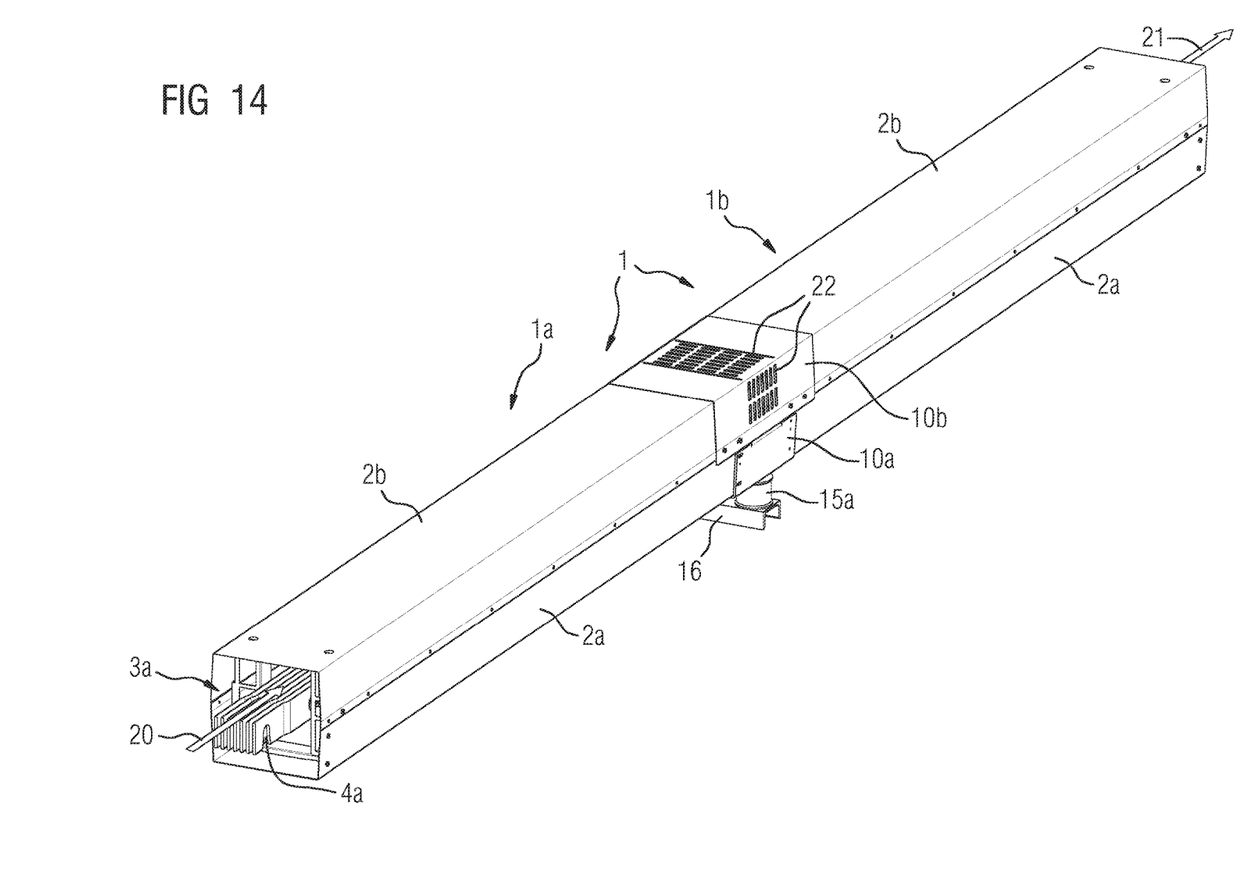
FIG. 14 shows the bar modules according to FIG. 9 which are connected by means of clamping brackets, with the housing closed.

FIG. 14 shows, for the sake of completeness, the two bar modules 1a, 1b which are connected to one another by means of a clamping bracket 9, with the housing 2, 10 comprising the lower parts 2a, 10a and the upper parts 2b, 10b closed.

In order to allow cooling air to flow through in the manner of a chimney (for example in the direction of the arrows 20, 21), in particular in the case of vertical orientation, when the housing 2 is closed, there are through-openings 7 in the frames 6 and slots 22 on the upper parts 2b, 10b. The size of the frame 6, of the through-openings 7 and of the slots 22 are matched to the housing size and the desired (cooling) air throughflow rate which accordingly automatically occurs in the case of vertical arrangement (chimney effect).

The invention claimed is:

1. A busbar system, comprising:
   a plurality of bar modules, situated one behind another and connected to one another via clamping brackets, each of the plurality of bar modules including a plurality of busbars arranged parallel to one another at a distance, each respective busbar of the plurality of busbars including recesses open on one side, at both ends, the recesses including
      a first recess running in a longitudinal extent at a first end of the respective busbar, and
      a second recess running transversely to the longitudinal extent at a second end of the respective busbar, the second recess including a widened portion running in the longitudinal extent to facilitate length compensation, wherein the widened portion lies on a line with the first recess and is wider than an opening of the second recess,
   wherein, for electrically connecting a first bar module and a second bar module of the plurality of bar modules, the first end of each respective busbar of the first bar module is plugged into a first side of a respective one of the clamping brackets via the first recesses which run in the longitudinal extent, and the second end of each respective busbar of the second bar module with the second recesses which run transversely to the longitudinal extent is suspended in the respective one of the clamping brackets on a second side of the respective one of the clamping brackets opposite the first side,
   wherein
      in each case one of the plurality of busbars of the first bar module bears laterally against one of the plurality of busbars of the second bar module, and
      the first recesses of each respective busbar of the first bar module and the second recesses of each respective busbar of the second bar module, as viewed from the side of the busbars, form a closed passage opening through which a clamping element, which is supported against the respective one of the clamping brackets, runs, the clamping element pressing the sides of the busbars, which each bear against one another, against one another.

2. The busbar system of claim 1, wherein
   the respective one of the clamping brackets is, in each case, arranged on a supporting mechanism,
   the supporting mechanism is a tower of a wind power plant, the plurality of bar modules are arranged one behind another in an interior of the tower, and the respective one of the clamping brackets is, in each case, fastened to the supporting mechanism via an elastic bearing.

3. The busbar system of claim 1, wherein the respective one of the clamping brackets is, in each case, formed as a separate unit.

4. The busbar system of claim 1, wherein the respective one of the clamping brackets, in each case, includes electrically insulating separating elements spaced apart from one another in parallel, and a distance between the electrically insulating separating elements and a shape of the electrically insulating separating elements are such that the plurality of busbars are pluggable in on the first side of the respective one of the clamping brackets and are suspendable on the second side of the respective one of the clamping brackets.

5. The busbar system of claim 1, further comprising spacer elements, respective spacer elements being plugged into each other, each of the respective spacer elements including a cylindrical central part against which a respective busbar bears, wherein a conical projection which extends radially outward is arranged on a casing of the cylindrical central part.

6. The busbar system of claim 1, wherein the busbars, which are arranged next to one another, include different cross sections.

7. The busbar system of claim 6, wherein, for a plurality of electrical circuits which are to be connected for current flow, a corresponding number of electrical circuit packages are arranged next to one another transversely to the longitudinal extent, a busbar being arrangable between the electrical circuit packages as a common ground conductor.

8. The busbar system of claim 7, further comprising:
a housing; and
a frame with a passage opening arranged in the housing, the plurality of busbars running through the passage opening so as to leave a distance, the frame including a supporting element arranged on an outer contour of the frame, the supporting element being movable in a direction of the longitudinal extent in the housing when the supporting element makes contact with a directly facing inner side of the housing.

9. The busbar system of claim 8, wherein the housing includes slots and the frame includes through-openings which allow a chimney effect for cooling the plurality of busbars in the case of vertical orientation of the busbar system.

10. The busbar system of claim 2, wherein the respective one of the clamping brackets is, in each case, formed as a separate unit.

11. The busbar system of claim 2, wherein the respective one of the clamping brackets, in each case, includes electrically insulating separating elements spaced apart from one another in parallel, and a distance between the electrically insulating separating elements and a shape of the electrically insulating separating elements are such that the plurality of busbars are pluggable in on the first side of the respective one of the clamping brackets and are suspendable on the second side of the respective one of the clamping brackets.

12. The busbar system of claim 2, further comprising spacer elements, respective spacer elements being plugged into each other, each of the respective spacer elements including a cylindrical central part against which a respective busbar bears, wherein a conical projection which extends radially outward is arranged on a casing of the cylindrical central part.

13. The busbar system of claim 2, wherein the busbars, which are arranged next to one another, include different cross sections.

14. The busbar system of claim 13, wherein, for a plurality of electrical circuits which are to be connected for current flow, a corresponding number of electrical circuit packages are arranged next to one another transversely to the longitudinal extent, a busbar being arrangable between the electrical circuit packages as a common ground conductor.

15. The busbar system of claim 14, further comprising:
a housing; and
a frame with a passage opening arranged in the housing, the plurality of busbars running through the passage opening so as to leave a distance, the frame including a supporting element arranged on an outer contour of the frame, the supporting element being movable in a direction of the longitudinal extent in the housing when the supporting element makes contact with a directly facing inner side of the housing.

16. The busbar system of claim 15, wherein the housing includes slots and the frame includes through-openings which allow a chimney effect for cooling the plurality of busbars.

* * * * *